(12) United States Patent
Pedersen

(10) Patent No.: US 9,606,533 B2
(45) Date of Patent: Mar. 28, 2017

(54) AUTOMATED ROOT CAUSE ANALYSIS

(75) Inventor: Henrik Pedersen, Herning (DK)

(73) Assignee: SIEMENS AKTIENGESELLSCHAFT, Munich (DE)

( * ) Notice: Subject to any disclaimer, the term of this patent is extended or adjusted under 35 U.S.C. 154(b) by 486 days.

(21) Appl. No.: 14/233,744

(22) PCT Filed: Dec. 9, 2011

(86) PCT No.: PCT/EP2011/072316
§ 371 (c)(1),
(2), (4) Date: Jan. 18, 2014

(87) PCT Pub. No.: WO2013/026501
PCT Pub. Date: Feb. 28, 2013

(65) Prior Publication Data
US 2014/0163926 A1     Jun. 12, 2014

(30) Foreign Application Priority Data

Aug. 19, 2011 (EP) .................................... 11178062

(51) Int. Cl.
| | |
|---|---|
| *G05B 23/02* | (2006.01) |
| *F01D 17/02* | (2006.01) |
| *F01D 21/00* | (2006.01) |
| *F02C 9/00* | (2006.01) |
| *G06Q 10/06* | (2012.01) |
| *G07C 3/00* | (2006.01) |

(52) U.S. Cl.
CPC ............. *G05B 23/02* (2013.01); *F01D 17/02* (2013.01); *F01D 21/00* (2013.01); *F01D 21/003* (2013.01); *F02C 9/00* (2013.01); *G05B 23/0278* (2013.01); *G06Q 10/0631* (2013.01); *G07C 3/00* (2013.01)

(58) Field of Classification Search
CPC .................................................. G05B 23/0278
USPC .......................................................... 702/183
See application file for complete search history.

(56) References Cited

U.S. PATENT DOCUMENTS

| | | | | |
|---|---|---|---|---|
| 4,215,412 A | * | 7/1980 | Bernier ..................... | G07C 3/00 701/100 |
| 8,543,356 B2 | * | 9/2013 | Migdall ..................... | G01S 7/41 702/187 |

(Continued)

FOREIGN PATENT DOCUMENTS

| | | |
|---|---|---|
| CN | 102155301 A | 8/2011 |
| EP | 1217189 A1 | 6/2002 |
| JP | 2005096674 A | 4/2005 |

*Primary Examiner* — Bryan Bui
(74) *Attorney, Agent, or Firm* — Beusse Wolter Sanks & Maire

(57) ABSTRACT

A method for performing computerized automated root cause analysis for a complex product, such as a turbine, and computer-readable medium encoded with programming instructions for performing such a root cause analysis are provided. The method may include: monitoring the product; detecting a product misbehavior; forming a misbehavior pattern with timeslots of normal operation and timeslots of misbehavior operation; comparing timeslots of the misbehavior pattern to corresponding timeslots of channels of information in at least one database relating to the product; measuring how close the misbehavior pattern numerically fits to the information; and automatically identifying a best numerical fit.

10 Claims, 4 Drawing Sheets

(56) References Cited

U.S. PATENT DOCUMENTS

| | | |
|---|---|---|
| 2005/0086529 A1 | 4/2005 | Buchsbaum |
| 2009/0276387 A1 | 11/2009 | Baliga |
| 2010/0017092 A1 | 1/2010 | Butler |
| 2011/0196593 A1 | 8/2011 | Bernard |

* cited by examiner

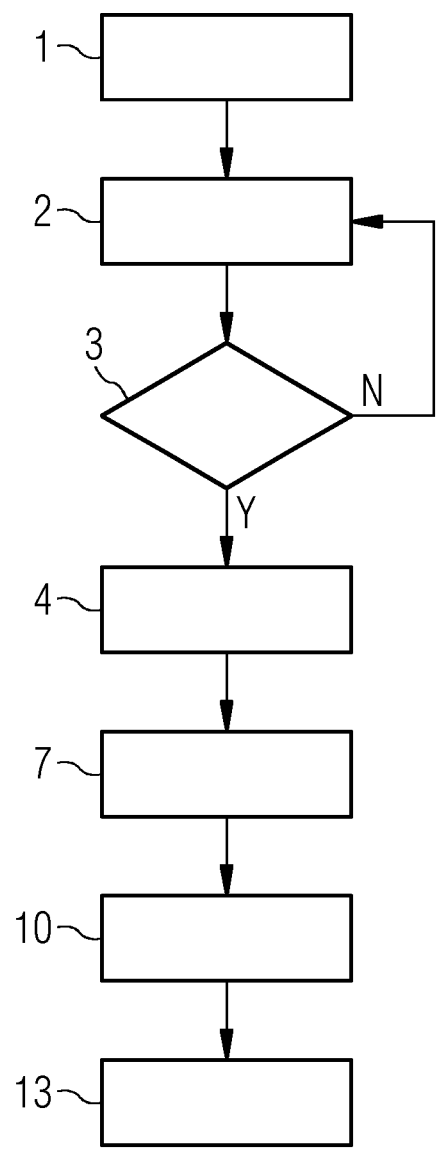

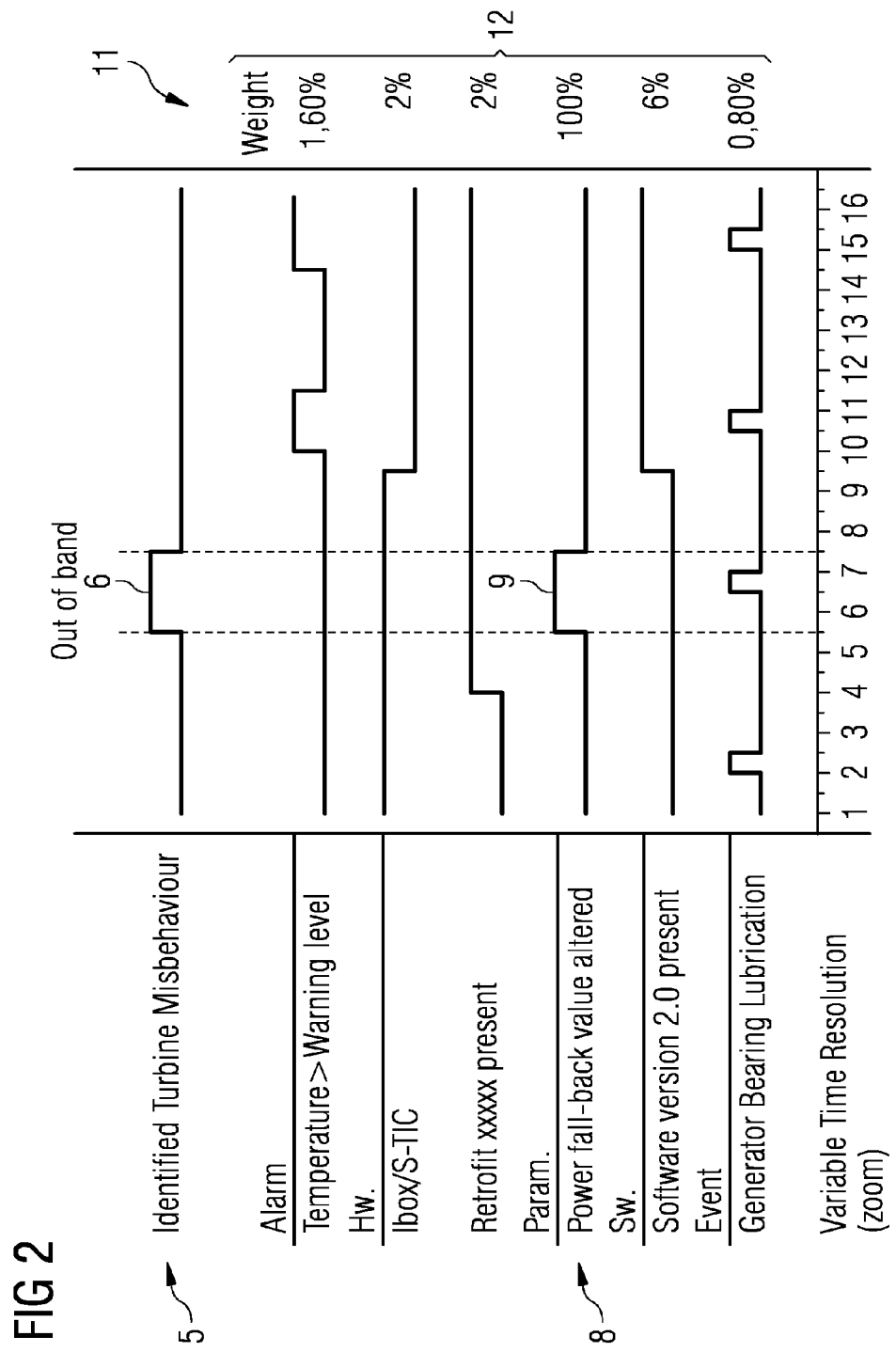

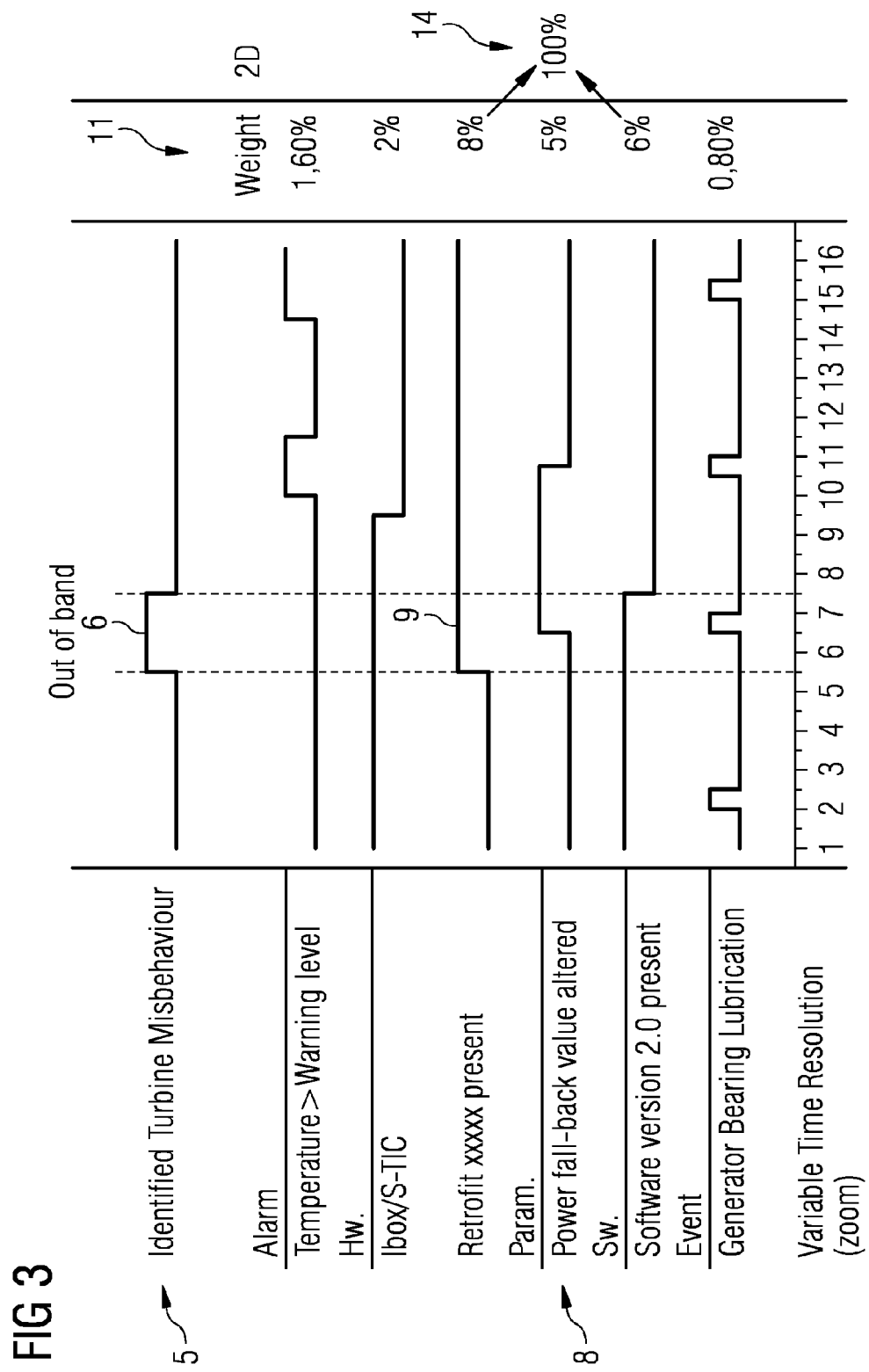

FIG 4

ADA correlation matrix

| Input Source | | MBM-deviation | Alarm events | Parts replaced | Parst deffect | Turbine standstill | Cronology | Time to troubleshoot | Time to repair | Turbine Age | Ext. weather cond. | Time to visit | Retroit present | Turbine type | Turbine type version | Turbine settings | Software versioning | Hardware-alterations |
|---|---|---|---|---|---|---|---|---|---|---|---|---|---|---|---|---|---|---|
| MBM/WFDB | MBM-deviation | x | | | | | | | | | | | | | | | | |
| MORS/EXITO | Alarm events | • | x | | | | | | | | | | | | | | | |
| CroDac | Parts replaced | • | • | x | | | | | | | | | | | | | | |
| CroDac | Parst deffect | • | • | • | x | | | | | | | | | | | | | |
| MORS/EXITO | Turbine standstill | • | • | | | x | | | | | | | | | | | | |
| | Cronology | • | • | | | • | x | | | | | | | | | | | |
| MORS/EXITO/CroDac | Time to troubleshoot | • | • | | | • | • | x | • | | | | | | | | | |
| MORS/EXITO/CroDac | Time to repair | • | • | | | • | • | • | x | | | | | | | | | |
| SAP | Turbine Age | | | | | | | | | x | | | | | | | | |
| Weather source/WFDB | Ext. weather cond. | | | | | | | | | | x | | | | | | | |
| MORS | Time to visit | | | | | | | | | | | x | | | | | | |
| SAP | Retroit present | | | | | | | | | | | | x | | | | | |
| SAP/service db/EXITO | Turbine type | | | | | | | | | | | | | x | | | | |
| SAP/service db/EXITO | Turbine type version | | | | | | | | | | | | | | x | | | |
| Turbine settings db | Turbine settings | | | | | | | | | | | | | | | x | | |
| Turbine settings db | Software versioning | | | | | | | | | | | | | | | | x | |
| Profile list | Hardware-alterations | | | | | | | | | | | | | | | | | x |

9

AUTOMATED ROOT CAUSE ANALYSIS

CROSS REFERENCE TO RELATED APPLICATIONS

This application is the US National Stage of International Application No. PCT/EP2011/072316 filed Dec. 9, 2011, and claims the benefit thereof. The International Application claims the benefit of European Application No. EP11178062 filed Aug. 19, 2011. All of the applications are incorporated by reference herein in their entirety.

FIELD OF THE INVENTION

The present invention relates in general to an automated root cause analysis. In particular, the present invention is directed to finding the root cause of a turbine like a turbine or wind turbine.

BACKGROUND OF INVENTION

Finding the root cause for misbehaviour of a certain product, such as a turbine, can be very time consuming, and is often characterized as a "search in blindness" in a vast amount of data available on a given turbine, or a group of turbines. The data can include a construction bill of materials (BOM), service events, parameter settings, software version, profiles, operational data, etc.

It is very difficult to search for explanations and reasons in distributed databases, and the data connected to a certain turbine is maintained in different departments of a company. The construction BOM can be located at a new unit and service alterations can be at a service department etc.

When a turbine or a group of turbines is identified to be out of normal behavior either by the turbine controller (alarm monitoring), by service engineering or by model based monitoring (dynamic limits) investigation on this is generally performed by technicians on site.

Only in special cases, remote analyses are performed. This remote analysis involves creating a picture of what has happened to this turbine since it was produced, to make sure that any event that may have caused the misbehavior is found. The data needed for this analysis is to be found in many different databases, in different departments, and in different structures. This is very time consuming, and there are substantial chances that something is missed that could point to the root cause. It actually turns out that in many cases when the root cause is known, one can also find an explanation in the kept data, but such an explanation was hidden due to the amount and complexity of the available data.

At least in view of the foregoing considerations, it is desirable to improve root cause analysis.

SUMMARY OF INVENTION

Aspects of the present invention are directed to a computerized automated root cause analysis for a complex product, with the following steps:
  Monitoring the product;
  Detecting a product misbehaviour;
  Forming a misbehaviour pattern with timeslots of normal operation and timeslots of misbehaviour operation;
  Comparing a timeslot of the misbehaviour pattern to corresponding timeslots of channels of information in at least one database relating to the product;
  Measuring how close the misbehaviour pattern numerically fits to the information; and
  Automatically identifying the best fit.

The automated method of root cause analysis can be performed specifically in a business where a high number of very complex products are controlled from one position and information on the product is highly distributed. This applies very well to wind turbine service and is also adaptable to transportation and other industries. Automating the root cause analysis will reduce the time to be spent on remote troubleshooting, operational follow up and technical support.

The method according to further aspects of the invention allows very fast identification of serial damages and enables to decide an action up-front.

The channels and/or the information can be aligned. This can include all available data from all turbines and make them available in a structured way like binning on timestamps, binning continuous measures etc.

The information and/or the at least one database can relate to a group of products instead of solely to the certain product. This broadens the base for comparisons and enhances the chances of finding the root cause, for example in finding explanations in the turbine structure by using bills of materials or the like.

Several channels, such as ranging from two to five channels, may be utilized for the fit. Depending on computational power, even more channels can be used. The usage of multiple channels improves the method of root cause analysis for distributed causes or errors, which may depend on several even independent conditions.

One database may contain a bill of materials from the production of the product which allows finding correlations even from before the turbine is constructed by using lists from sub suppliers as versions, batches, series, age of components or the like.

A matrix may correlate one event of misbehaviour to a database and/or a channel for the comparison of timeslots. A programming/mathematical processing software, for example using ADA programming language, can be used for the matrix. The use of such a matrix reduces the amount of data that has to be compared thus easing the whole procedure.

A misbehaviour pattern may be detected before it leads to a failure of the product and a failure of the product may be predicted and prevented. A service or emergency operation flag can be set or actions can be scheduled immediately or at the next planned service.

An indicator indicating the numerical fit of the misbehaviour pattern to the information and/or channel can be calculated. The indicator can be a number in the range from one to hundred wherein a number of hundred can indicate the best fit. This indicator eases the following evaluation and processing.

An ordered list of indicators can be generated. In this list the indicators can be ordered according to their number or the like allowing a prioritized representation of explanations for the root cause of the misbehaviour.

The product may be a turbine. The term turbine encompasses a wind turbine (complete or parts like the generator) or a turbine, such as may be used for power generation.

BRIEF DESCRIPTION OF THE DRAWINGS

The accompanying drawings are included to provide a further understanding of embodiments. Other embodiments and many of the intended advantages will be readily appreciated as they become better understood by reference to the following detailed description. The elements of the drawings do not necessarily scale to each other. Like reference numbers designate corresponding similar parts.

FIG. 1 illustrates a schematic flow chart of a root cause analysis according to aspects of the invention.

FIG. 2 illustrates a schematic view of a first example of a root cause analysis according to aspects of the invention.

FIG. 3 illustrates a schematic view of a second example of a root cause analysis according to aspects of the invention.

FIG. 4 illustrates an example of a matrix correlating certain misbehaviour to a database according to aspects of the invention.

DETAILED DESCRIPTION OF THE ILLUSTRATED EMBODIMENTS

In the following detailed description, reference is made to the accompanying drawings which form a part hereof and in which are shown by way of illustration specific embodiments in which the invention may be practiced. In this regard, directional terminology, such as "top" or "bottom" etc., is used with reference to the orientation of the Figure(s) being described. Because components of embodiments can be positioned in a number of different orientations, the directional terminology is used for purposes of illustration and is in no way limiting. It is to be understood that other embodiments may be utilized and structural or logical changes may be made without departing from the scope of the present invention. The following detailed description, therefore, is not to be taken in a limiting sense, and the scope of the present invention is defined by the appended claims.

FIG. 1 shows a flow chart of the computerized automated root cause analysis. Although several steps are shown and described not all steps are mandatory for the invention. The first step for example can be omitted.

As a prerequisite for automated root cause analysis, all the available data can be aligned in a first step 1. This can be done not only for the single product to be monitored but for all products of the same or similar kind. Here, a turbine is taken as an example. Accordingly, data from all turbines is taken and made available in a structured way. This can include binning on timestamps, binning continuous measures, etc. This process can be on going and is not necessarily a part of the invention.

In a second step 2 the turbine is monitored. As the turbine is monitored to detect turbine misbehaviour technical parameters of the turbine are monitored.

In a third step 3 detection for turbine misbehaviour takes place. In normal operation no misbehaviour is detected and the process flow goes back to step 2 for further monitoring. Once a turbine misbehaviour is detected the process or method branches to a fourth step 4. The misbehaviour can be an error or a value being out of a normal band. The turbine misbehaviour is the input for the automated root cause analysis. The misbehaviour can be, for example a rise in alarm events, findings at scheduled services, service engineering and also a model based monitoring which will detect turbines with abnormal behaviour below the fixed alarm limits which can be referred to as dynamic limits.

In step 4 a misbehaviour pattern 5 with timeslots of normal operation and timeslots of misbehaviour operation 6 is formed. The misbehaviour pattern 5 is shown in the top of FIG. 2. This turbine misbehaviour is clustered to form this pattern 5 that can be compared to information in all the databases containing relevant information. In detail the process will identify timeslots of when the turbine was in normal operation and when not.

In a further step 7 one, several or all timeslots of the misbehaviour pattern 5 are compared to channels 8 of information in at least one database relating to the turbine. It can be sufficient to automatically compare only the timeslot of misbehaviour 6 to corresponding timeslots 9 of the channels 8.

The method receives its input manually or automatically as a cluster/group of turbines and with the time where this/these turbines were judged to be out of normal behaviour. This is then the misbehaviour pattern.

The method searches for correlations from even before the turbine is constructed by lists from sub suppliers on versions, batches, series, age of components etc. From the time of construction, databases can include a bill of materials with detailed information on all components in the turbine, version sizes, ratings, ages etc. From the commissioning of the turbine, databases can include information available only to a project before handover to service. Thereafter, the entire lifespan of the turbine can be accessed like software versions, retrofits, change of settings, adjustments, parts replaced, defect codes of the replaced parts etc. Including these databases gives the complete history of all turbines.

For example, by comparing data from the production bill of materials, the method can identify bad deliverances from sub suppliers like a batch with bad or wrong components.

The timeslots of misbehaviour 6 of the misbehaviour pattern 5 are compared to the corresponding channels 8 or timeslots in all other databases like shown in FIG. 2.

The automatic scan of all databases available can be steered with a matrix 9 like an ADA matrix shown in FIG. 4. According to this matrix 9 only certain databases or channels 8 are compared which match to the input source or the type of the misbehaviour.

In a next step 10 it is measured how close the misbehaviour pattern 5 fits to the information and/or the timeslots 9 in the channels 8. A function is provided to measure how closely the pattern fits and an indicator 11 or value or weight from one to one hundred is set which is shown in the right column of FIG. 2.

The indicator 11 is the result of a calculation to indicate the fit to a corresponding pattern or channel 8. These indicators 11 will then form a list 12 of the most likely explanations to the unwanted behaviour. The method may show many, few or no pattern fit.

An iteration process may initiate to compensate for time differences or time lags as shown in the lowest line in FIG. 3 ("zoom").

In a next step 13 the best fit is automatically identified. The best fit between the misbehaviour pattern 5 or the time-slot of misbehaviour 6 and the channel 8 or the corresponding timeslot 9 can be chosen among the indicators 11 or from the list 12.

Additionally, the method can also cluster a group of turbines in order to find explanations in the turbine structure using for example the bills of materials.

Some human intervention may be required to reason upon the findings. A final report is reported automatically and is forwarded to the personnel responsible to correct the problems and/or to further systems.

In FIG. 3 a situation is shown where several conditions exist that need to be met to identify the misbehaviour. When, for example a turbine with a specific retrofit needs a corresponding software or software version the method uses two channels 8 to make the correlation. The correlation correlates the two corresponding indicators which have a value or weight of 6% and 8%, respectively to a secondary indicator 14 having a value of 100%.

The method can handle a correlation of more channels, for example ranging from two to five channels. The number of channels may depend on computational power.

As an additional feature the system can find and recognize misbehaviour patterns that will lead to failure before a failure actually occurs. By that approach, turbine failure is predicted and prevented by taking preventive actions remotely or at a next planned service. This feature may rely on precise feedback on service events.

The invention claimed is:

1. A method comprising:
    monitoring, by a turbine controller, technical parameters of a turbine;
    detecting a turbine misbehaviour including abnormal turbine behaviour below a fixed alarm limit based on the monitoring of the turbine;
    performing computerized root cause analysis based on the detected turbine misbehaviour to determine a root cause of the turbine misbehaviour, the root cause analysis comprising:
        forming a misbehaviour pattern predicting failure of the turbine with timeslots of normal operation of the turbine and timeslots of the detected turbine misbehaviour of the turbine wherein the misbehaviour pattern is based on a cluster of misbehaviour;
        comparing a timeslot of the misbehaviour pattern to corresponding timeslots for each information associated with a type of the turbine misbehaviour in at least one database relating to the turbine;
        calculating an indicator, for said each information, indicative of a fit of the misbehaviour pattern;
        ordering into a list the calculated indicator for said each information to prioritize a representation of a root cause of the turbine misbehaviour; and
        automatically identifying a best fit from the list; and
    taking preventive actions to prevent the failure associated with the root cause associated with the best fit.

2. The method according to claim 1, wherein the information is aligned wherein the aligned information being structured by binning continuous measures associated with a group of turbines.

3. The method according to claim 1, wherein said each information and/or the at least one database relates to a group of turbines.

4. The method according to claim 1, wherein the at least one database comprises a bill of materials from the production of the turbine.

5. The method according to claim 1, wherein the comparing includes using a matrix wherein the matrix correlates the detected misbehaviour to a database of the at least one database for the comparison of timeslots.

6. The method according to claim 1, wherein said each information includes:
    information associated the turbine before construction, including information associated with lists from suppliers on versions, batches, series, and age of components;
    information associated with time of construction including a bill of materials for the turbine including information associated with at least one of version sizes, ratings, and ages of the components in the bill of materials; and
    information associated with commissioning of the turbine.

7. The method according to claim 1, wherein the turbine is a wind turbine.

8. The method according to claim 1, wherein the turbine is configured for power generation.

9. The method according to claim 1, wherein the information being structured by binning on timestamps associated with a group of turbines.

10. The method according to claim 1, wherein the monitoring includes model based monitoring to detect the abnormal behaviour below the fixed alarm limits.

* * * * *